US011268361B2

(12) United States Patent
Jensen et al.

(10) Patent No.: US 11,268,361 B2
(45) Date of Patent: Mar. 8, 2022

(54) SEPARATION ASSEMBLY (71) Applicant: WESTERMAN, INC., Bremen, OH (US)

(72) Inventors: Nicholas Lee Jensen, Talala, OK (US); Spencer Scott Bruner, Owasso, OK (US); Derek Rupp, Owasso, OK (US)

(73) Assignee: WESTERMAN, INC., Bremen, OH (US)

( * ) Notice: Subject to any disclaimer, the term of this patent is extended or adjusted under 35 U.S.C. 154(b) by 378 days.

(21) Appl. No.: 16/396,868

(22) Filed: Apr. 29, 2019

(65) Prior Publication Data
US 2020/0340338 A1 Oct. 29, 2020

(51) Int. Cl.
*E21B 43/34* (2006.01)
*B01D 17/028* (2006.01)
*B01D 19/00* (2006.01)
*E21B 43/16* (2006.01)
*B01D 17/02* (2006.01)

(52) U.S. Cl.
CPC ........... *E21B 43/16* (2013.01); *B01D 17/0211* (2013.01); *B01D 19/0042* (2013.01); *E21B 43/34* (2013.01); *B01D 17/0214* (2013.01)

(58) Field of Classification Search
CPC ............ B01D 17/0211; B01D 17/0214; B01D 19/0042; E21B 43/34
USPC .......... 210/519, 521, 539, 540, 801; 96/182, 96/183, 184; 166/75.12
See application file for complete search history.

(56) References Cited

U.S. PATENT DOCUMENTS 4,886,605 A * 12/1989 Herve .................. E03F 11/00
210/519
5,204,000 A * 4/1993 Steadman .......... B01D 17/0214
210/519
5,415,776 A * 5/1995 Homan .............. B01D 17/0208
210/519

(Continued)

FOREIGN PATENT DOCUMENTS

| EP | 0958473 | 11/1999 |
|---|---|---|
| FR | 2707369 | 1/1995 |
| JP | 2008164132 | 7/2008 |

OTHER PUBLICATIONS

Notification of transmittal of the International search report and the written opinion of the International searching authority PCT/US2019/057655; dated Feb. 6, 2020.

*Primary Examiner* — Christopher Upton
(74) *Attorney, Agent, or Firm* — Moore & Van Allen PLLC; Christopher J. Knors (57) ABSTRACT

Provided is an assembly including a vessel having first and second ends and an interior, an inlet diverter disposed in the interior at the first end, at least one flow baffle disposed in the interior and having a gas section including a plurality of gas openings extending through the baffle, a liquid section below the gas section including a plurality of liquid openings extending through the baffle, and a bottom surface spaced from a bottom interior surface of the vessel to define a fluid flow path between the bottom surface and the bottom interior surface, and at least one vane section disposed in the interior downstream of the at least one flow baffle, the at least one vane section having a bottom surface spaced from the bottom interior surface of the vessel to define a fluid flow path between the bottom surface and the bottom interior surface.

18 Claims, 12 Drawing Sheets

(56) References Cited

U.S. PATENT DOCUMENTS

| | | | | |
|---|---|---|---|---|
| 5,837,152 | A * | 11/1998 | Komistek | B01D 17/0214 |
| | | | | 210/801 |
| 5,902,483 | A * | 5/1999 | Edmondson | B01D 17/0211 |
| | | | | 210/521 |
| 6,315,898 | B1 * | 11/2001 | Bull | B01D 17/0211 |
| | | | | 210/187 |
| 6,537,458 | B1 * | 3/2003 | Polderman | B01D 17/0214 |
| | | | | 210/801 |
| 6,827,865 | B1 * | 12/2004 | Fenwick | B01D 17/0211 |
| | | | | 210/521 |
| 7,549,555 | B2 | 6/2009 | Gosei | |
| 8,470,080 | B1 | 6/2013 | Ball, IV et al. | |
| 9,643,105 | B1 | 5/2017 | Walker | |
| 2004/0222149 | A1 * | 11/2004 | Abrams | B01D 17/0211 |
| | | | | 210/519 |
| 2014/0014668 | A1 | 1/2014 | Vieira et al. | |
| 2020/0230522 | A1 * | 7/2020 | Johnson | B01D 17/0211 |
| 2020/0340347 | A1 * | 10/2020 | Jensen | B01D 19/0042 |
| 2020/0340348 | A1 * | 10/2020 | Jensen | B01D 19/0042 |

* cited by examiner

SEPARATION ASSEMBLY

TECHNICAL FIELD

In general, the present invention relates to a separation assembly, and in particular to a three phase separation assembly.

BACKGROUND OF THE INVENTION

The oil and gas industry requires multiphase mixtures to be separated in preparation for downstream processing. Gas produced from an oil or gas well will contain oil and water. Before the gas and crude oil can be refined, the liquids are separated from the gas, and the gas and water are separated from the oil. The separators function to separate a stream into oil, gas, and water components, and then function to separate the gas from the liquids, and the water from the oil. Some separation techniques utilize separation apparatuses positioned within the separator.

SUMMARY OF THE INVENTION

The present application provides an assembly including a vessel having a separation section and a collection section. Disposed in the separation section is an inlet diverter that receives a three phase fluid and directs the fluid back towards an end of the vessel, at least one separation baffle, and at least one vane section. Separated fluids exit the separation section and flow toward the collection section, which can collect and discharge the various separated fluids.

In accordance with an embodiment of the present invention, an assembly is provided that includes a vessel having first and second ends and an interior defining a separation section and a collection section, an inlet diverter disposed in the interior at the first end and configured to receive a three phase fluid flowing in a first direction from the first end toward the second end and direct the fluid in a second direction opposite the first direction towards the first end, at least one flow baffle disposed in the interior downstream of the inlet diverter, the at least one flow baffle having a gas separation section including a plurality of gas openings extending through the baffle, a liquid separation section below the gas separation section including a plurality of liquid openings extending through the baffle, and a bottom surface spaced from a bottom interior surface of the vessel to define a fluid flow path between the bottom surface and the bottom interior surface, and at least one vane section disposed in the interior downstream of the at least one flow baffle for serving as a demister for gas flowing therethrough and as a coalescing device for liquid flowing therethrough, the at least one vane section having a bottom surface spaced from the bottom interior surface of the vessel to define a fluid flow path between the bottom surface and the bottom interior surface.

In accordance with another embodiment of the present invention, an assembly is provided that includes a vessel having first and second ends and an interior defining a separation section and a collection section, an inlet diverter disposed in the interior at the first end and configured to receive a three phase fluid flowing in a first direction from the first end toward the second end and direct the fluid in a second direction opposite the first direction towards the first end into the collection section, at least one flow baffle disposed in the interior downstream of the inlet diverter, the at least one flow baffle having a bottom surface spaced a first distance from a bottom interior surface of the vessel to define a fluid flow path between the bottom surface and the bottom interior surface, and at least one vane section disposed in the interior downstream of the at least one flow baffle, the at least one vane section having a bottom surface spaced a second distance greater than the first distance from the bottom interior surface of the vessel to define a fluid flow path between the bottom surface and the bottom interior surface and to serve as a fluid seal.

In accordance with still another embodiment of the present invention, an assembly is provided that includes a vessel having first and second ends, an inlet diverter disposed in the interior at the first end, at least one first baffle disposed in the interior downstream of the inlet diverter, the at least one first baffle having a top surface abutting a top interior surface of the vessel and a bottom surface spaced from a bottom interior surface of the vessel, at least one second baffle disposed in the interior downstream of the at least one first baffle, the at least one second baffle having a top surface spaced from the top interior surface of the vessel and a bottom surface spaced from the bottom interior surface of the vessel, and at least one vane section disposed in the interior downstream of the at least one first baffle, the at least one vane section having a top surface abutting the top interior surface of the vessel and a bottom surface spaced from the bottom interior surface of the vessel.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Embodiments of the invention relate to methods and systems that relate an assembly including a vessel having a separation section and a collection section. Disposed in the separation section is an inlet diverter that receives a three phase fluid and directs the fluid back towards an end of the vessel to reduce the flow rate of the three fluid and to increase the liquid droplet residence time. Also disposed in the separation section is at least one separation baffle for slowing down and assisting in separation of the fluid, and at least one vane section for separating the fluid flowing therethrough. Separated fluids exit the separation section and flow toward the collection section, which can collect and discharge the various separated fluids.

With reference to the drawings, like reference numerals designate identical or corresponding parts throughout the several views. However, the inclusion of like elements in different views does not mean a given embodiment necessarily includes such elements or that all embodiments of the invention include such elements. The examples and figures are illustrative only and not meant to limit the invention, which is measured by the scope and spirit of the claims.

Turning initially to FIGS. 1-8, a separation assembly is shown generally at reference numeral 10. The assembly include a vessel 12 and legs 14 connected to the vessel 12 for supporting the vessel 12. The vessel includes a sidewall 20, an end cap 22 at a first end of the sidewall 20, and an end cap 24 at a second end of the sidewall 20. As illustrated, the sidewall 20 is tubular in shape and the end caps 22 and 24 are dome shaped and connected to the sidewall 20 to close the first and second ends. The end cap 22 includes an inlet 30 extending into an interior 32 (FIG. 9) of the vessel 12 and the end cap 24 includes a plurality of ports 34, for example for receiving sight glasses to monitor fluid levels in the vessel 12. The sidewall 20 includes a plurality of ports 36 at the side of the sidewall 20, for example for receiving sight glasses to monitor fluid levels in the vessel 12, a plurality of ports 38 at a top of the sidewall 20, for example for receiving suitable sensors, one or more ports 40, and as shown two ports at a bottom of the sidewall 20 serving as drains, for example for sediment, and one or more ports 42, and as shown two access ports configured to be covered by suitable covers.

Referring additionally to FIGS. 9-13, the interior 32 of the vessel 12 is separated into a separation section 50 and a collection section 52. As shown, the collection section 52 is provided downstream of the separation section 50 proximate the end cap 24. The separation section 50 receives a fluid, such as a three phase fluid having a gas and a lighter and heavier liquid phase, such as water and oil at the inlet 30. Connected to the inlet 30 is an inlet diverter 54 that receives the three phase fluid flowing in a first direction from the inlet toward the end cap 24 and directs the three phase fluid in a second direction opposite the first direction back towards the end cap 22 to reduce the flow rate of the three fluid and to increase the liquid droplet residence time. The inlet diverter 54 may be a suitable inlet diverter, such as the inlet diverter disclosed in U.S. Pat. No. 9,643,105 issued May 9, 2017, which is hereby incorporated herein by reference.

Figure 12:
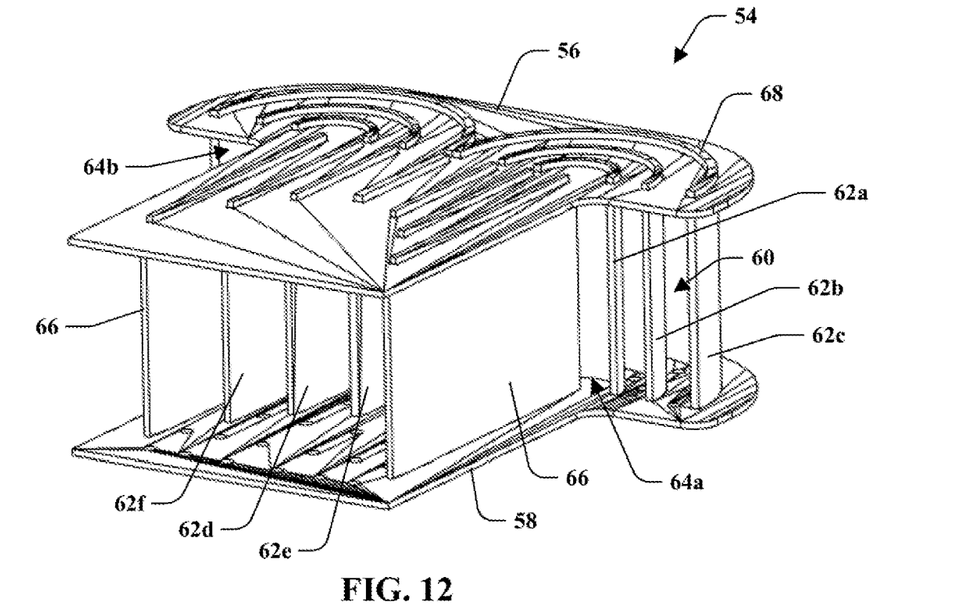
FIG. 12 is a perspective view of an inlet diverter.
Figure 13:
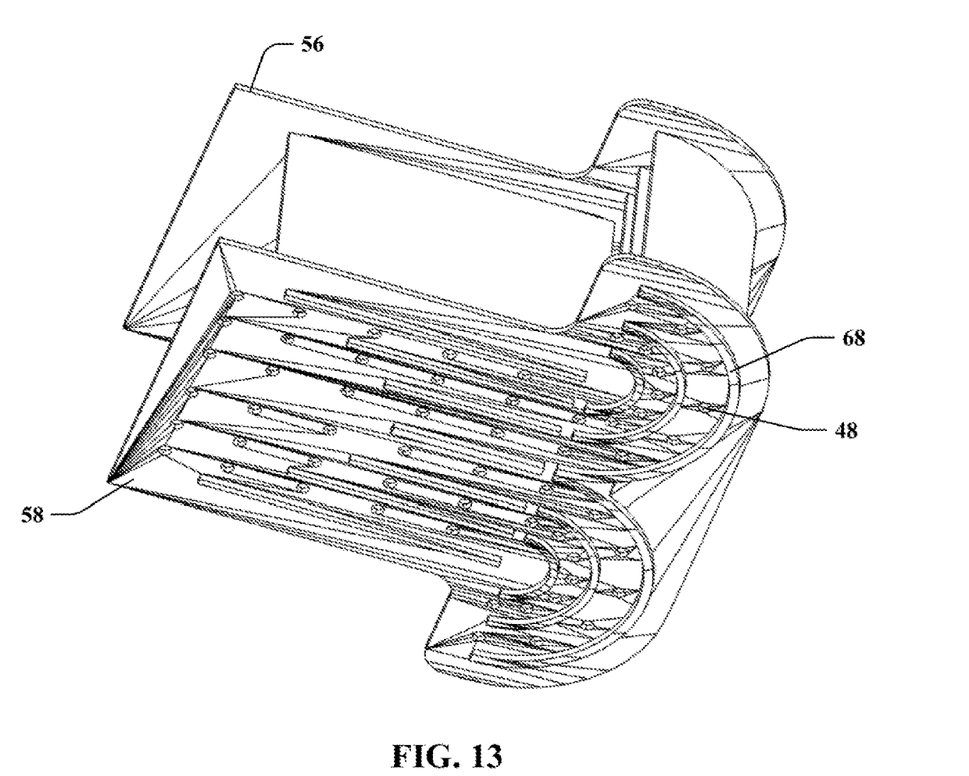
FIG. 13 is another perspective view of the inlet diverter.

The inlet diverter 54 includes a top plate 56, a bottom plate 58, and a vane assembly 60 therebetween having a plurality of vanes positioned beside each other, such as in a nested arrangement. For example, the vane assembly 60 can include a plurality of vanes 62a, 62b, 62c, 62d, 62e, and 62f, where the vanes 62a-62c are in a first vane group 64a, and the vanes 62d-62f are in a second vane group 64b. In some embodiments, the first vane grouping 64a is generally symmetrical to and a mirror image of the second vane grouping 64b, as shown. Each of the vane groupings 64a, 64b has a plurality of vanes that are vertically positioned beside and spaced laterally from each other. In the illustrated embodiment, the first vane grouping 64a includes an innermost vane 62a, an inner vane 62b, and an outermost vane 62c. Similarly, the second vane grouping 64a includes an innermost vane 62d, an inner vane 62e, and an outermost vane 62f. The inlet diverter 54 also has a diverter plates 66 flanking the first and second vane groups. The diverter plates 66 do not have curved sections and assist in routing the flow of a multiphase mixture towards the vane assembly. The inlet diverter 54 also includes vane guides 68 on the top plate 56 and bottom plate 58 providing a visual indication of the vane paths, and a plurality of apertures 48 in the bottom plate 58 that can allow entrained particulates, such as sand or other debris that may collect between vanes of the vane assembly during operation, to fall through the apertures 48 so that it does not collect in the passages between the vanes. The plurality of apertures 48 can be provided along the respective flow paths along the curves thereof.

Each vane can have a leading portion where the mixture is received that extends outwardly and a trailing portion where the mixture exits that extends outwardly extending in a direction back towards the inlet. Each leading portion can have a leading edge that faces the incoming multiphase mixture stream. Each trailing portion of the vanes in the vane assembly can have a trailing edge.

Figure 1:
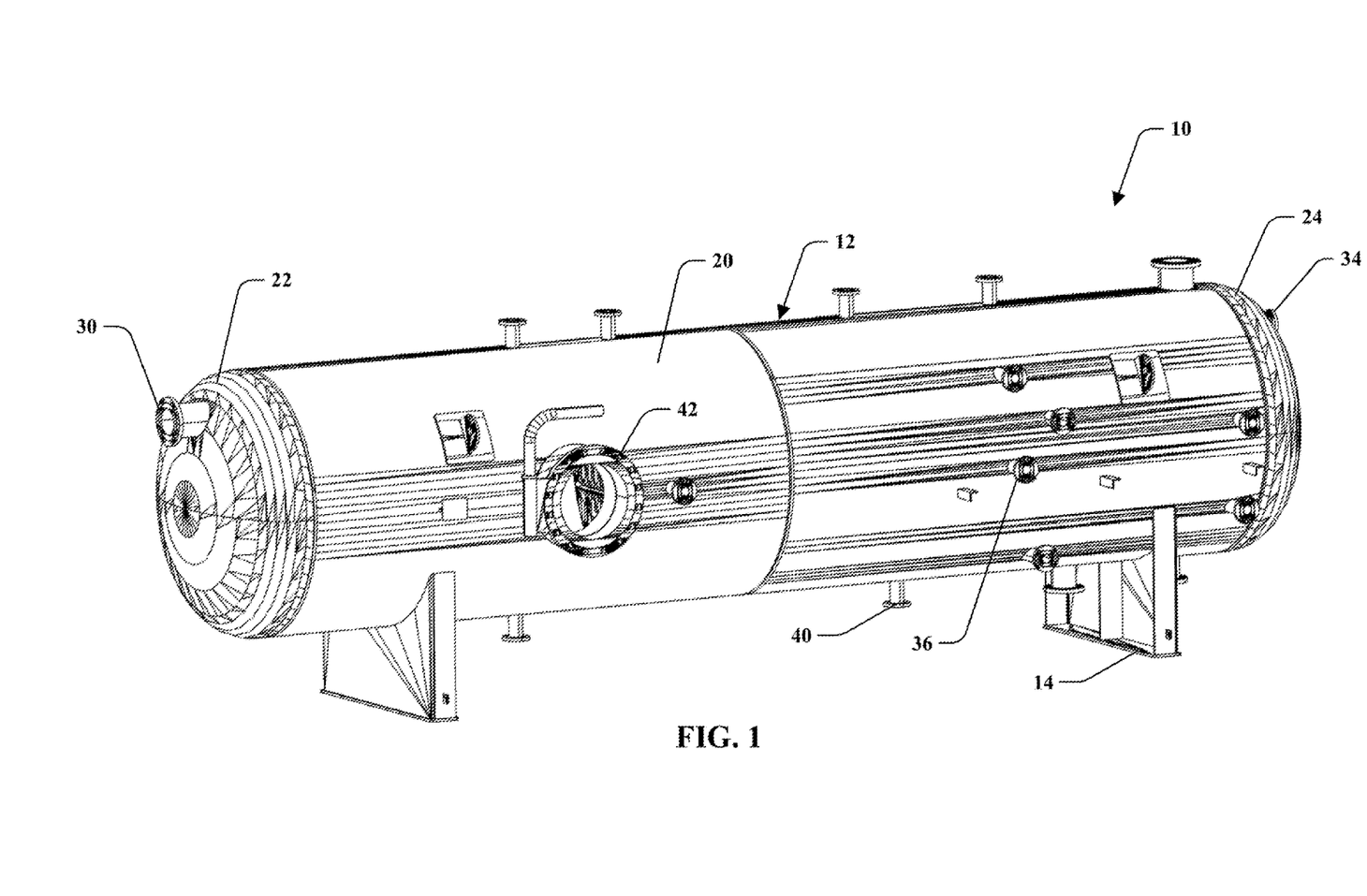
FIG. 1 is a perspective view of an exemplary separation assembly.
Figure 2:
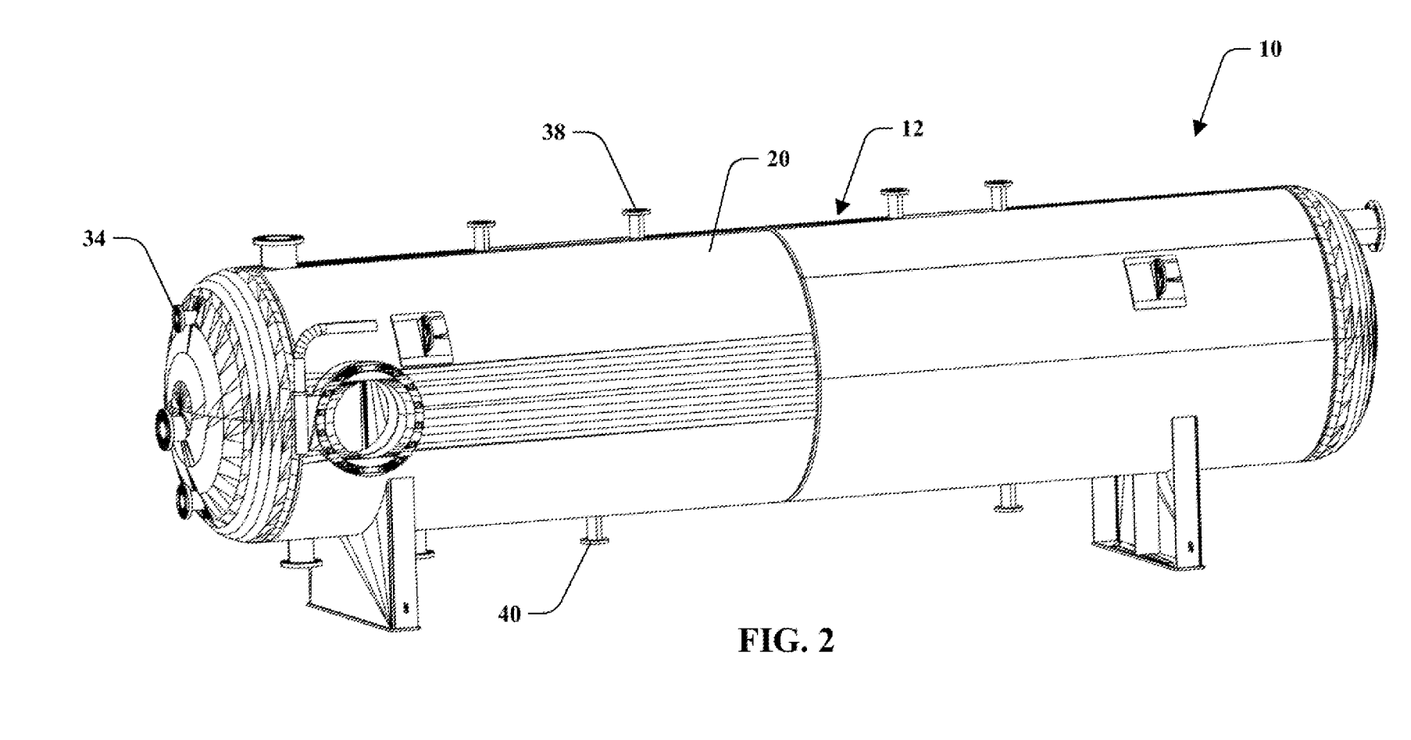
FIG. 2 is another perspective view of the separation assembly.
Figure 3:
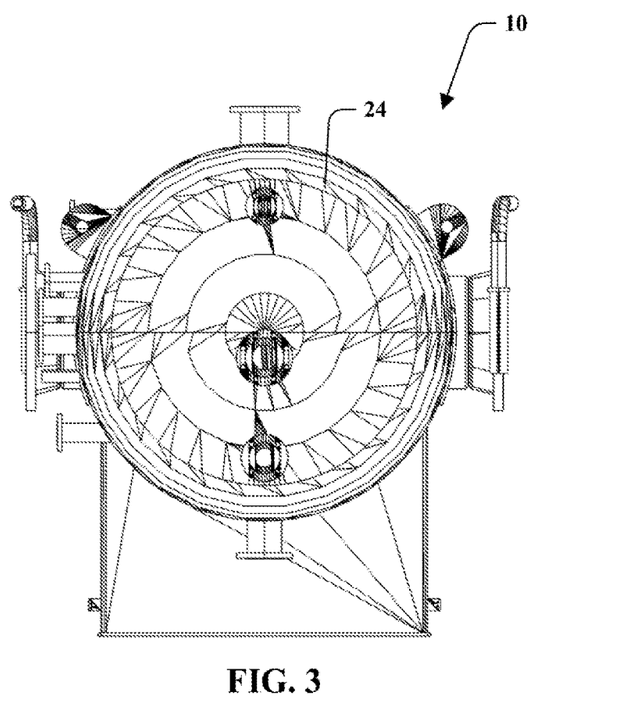
FIG. 3 is a front view of the separation assembly.
Figure 4:
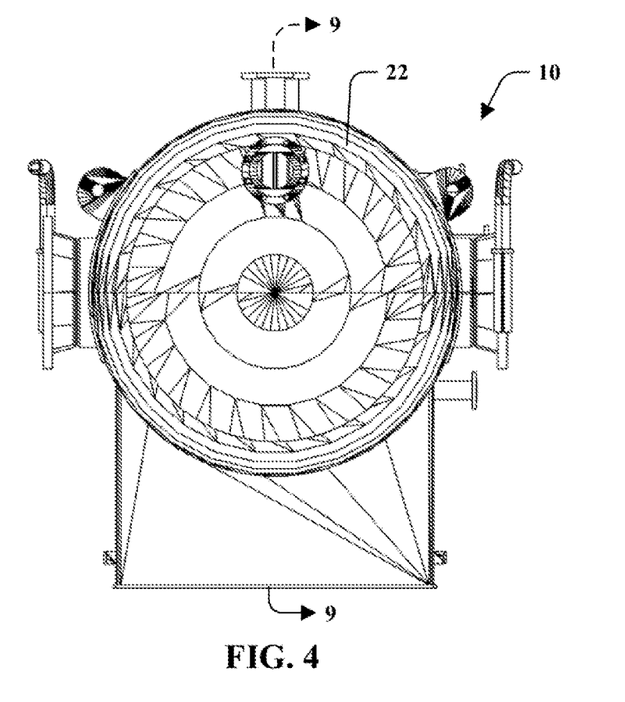
FIG. 4 is a rear view of the separation assembly.
Figure 5:
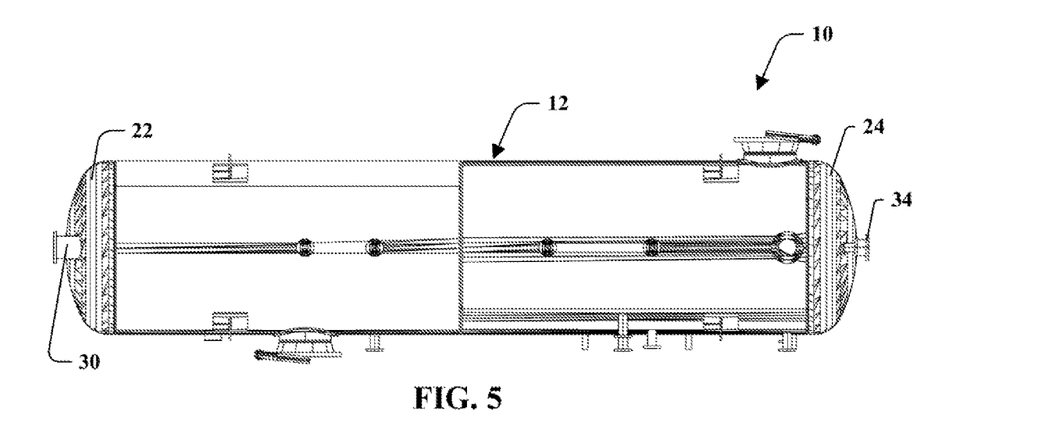
FIG. 5 is a top view of the separation assembly.
Figure 6:
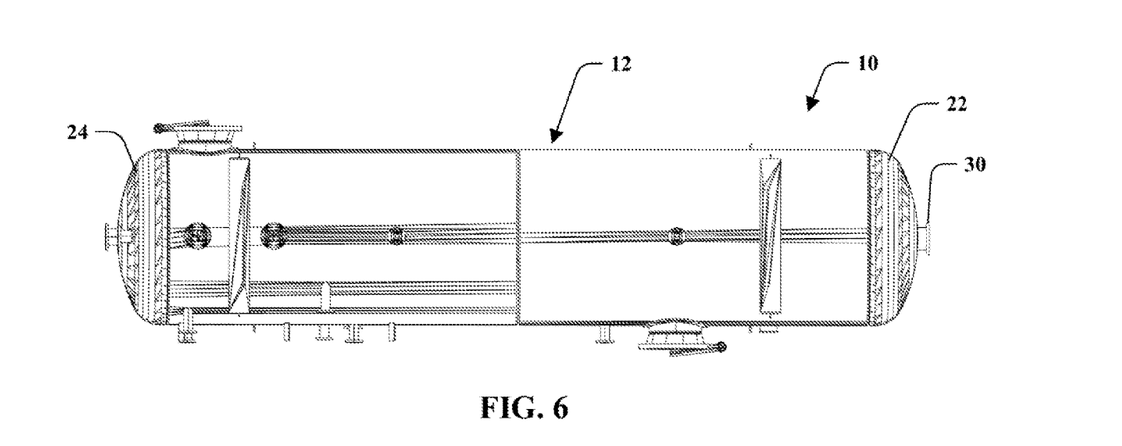
FIG. 6 is a bottom view of the separation assembly.
Figure 7:
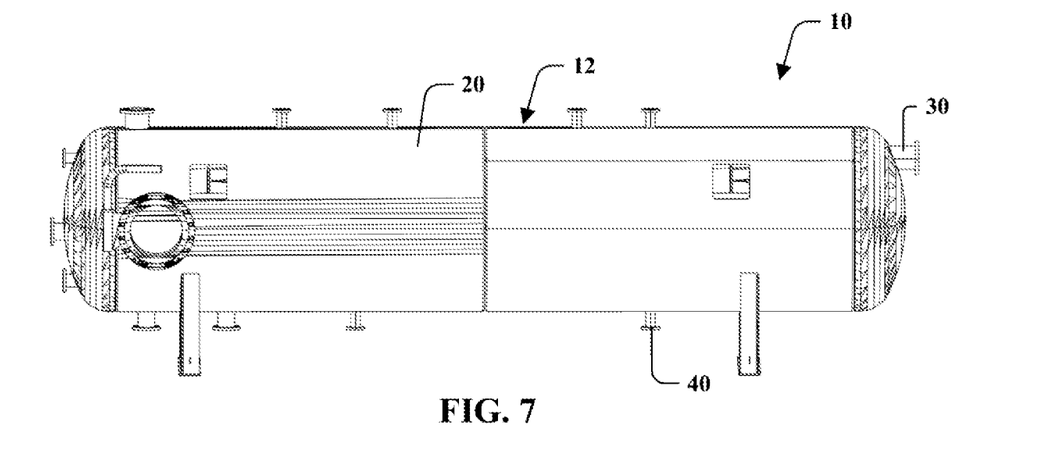
FIG. 7 is a left side view of the separation assembly.
Figure 8:
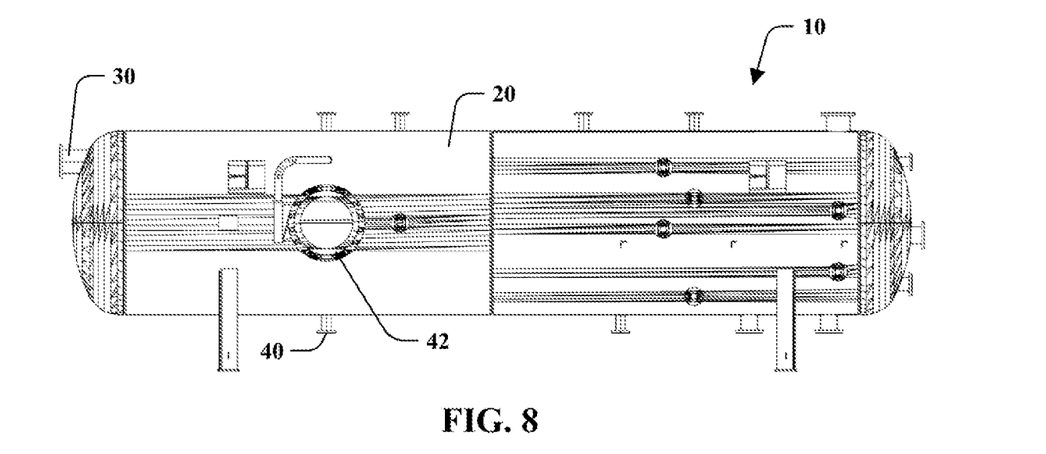
FIG. 8 is a right side view of the separation assembly.
Figure 9:
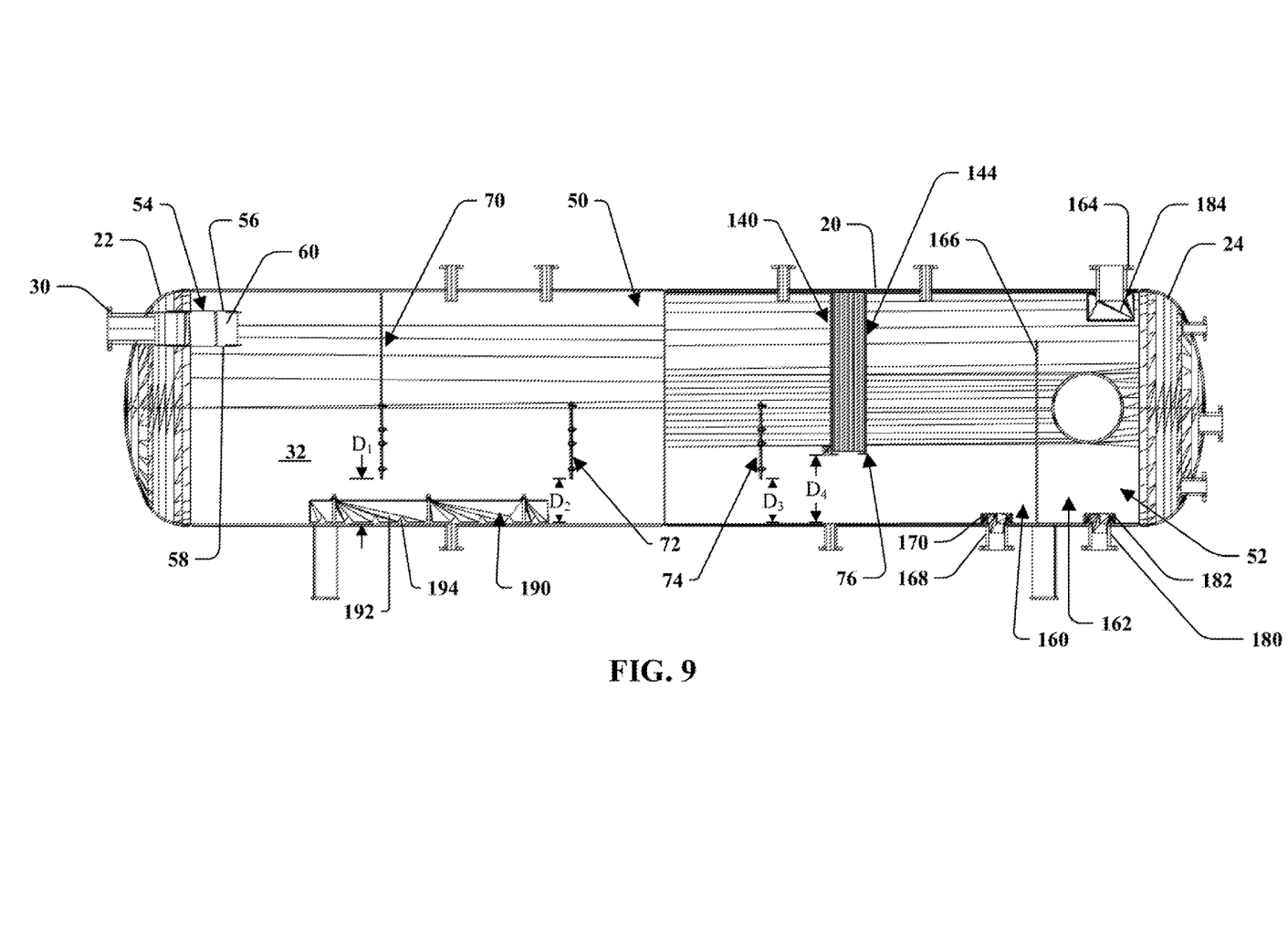
FIG. 9 is a cross-sectional view taken about line 9-9 in FIG. 4.
Figure 10:
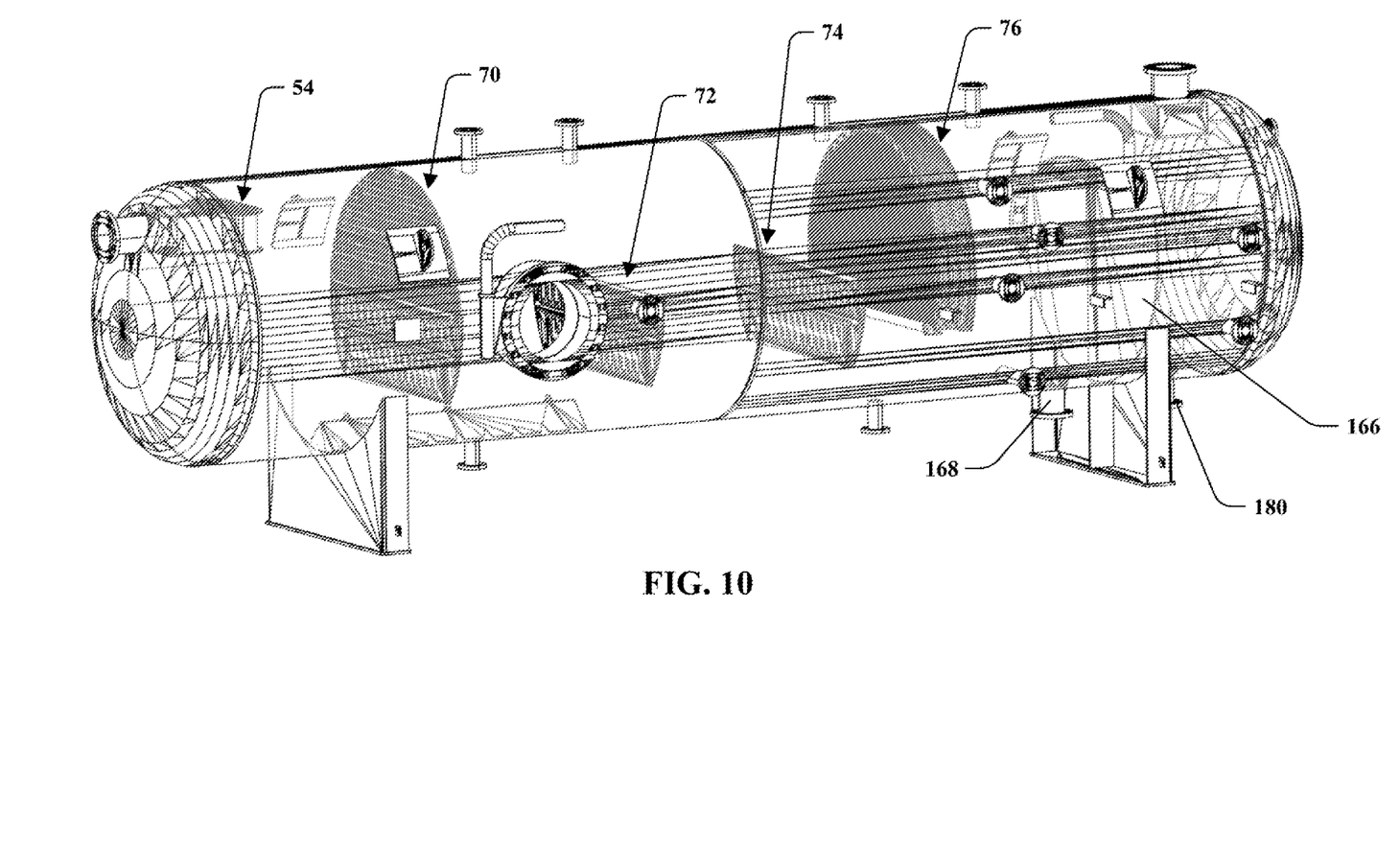
FIG. 10 is a perspective view of the separation assembly with a vessel being transparent.
Figure 11:
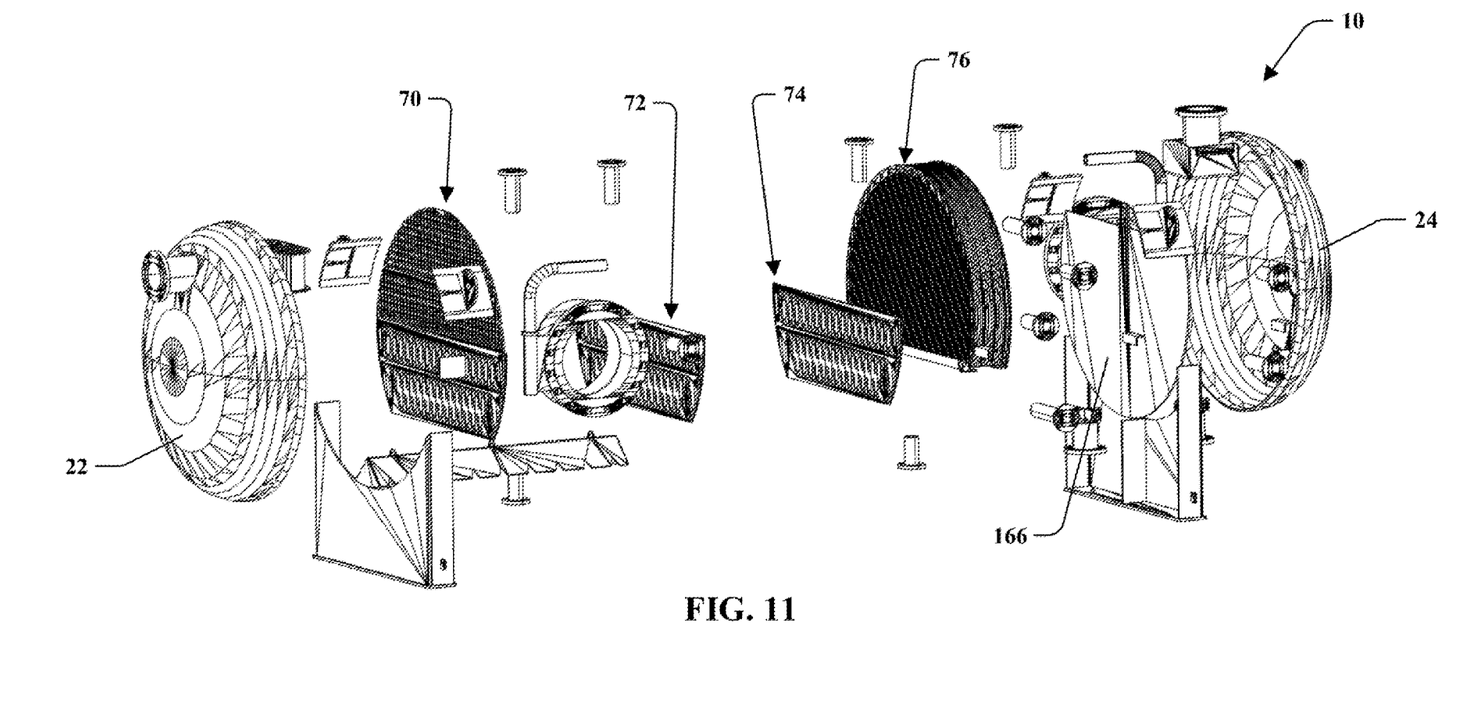
FIG. 11 is a perspective view of the separation assembly with the vessel removed.

Disposed in the separation section 50 is a first separation baffle 70 proximate the inlet diverter 54, a second separation baffle 72 downstream of the first separation baffle 70, a third separation baffle 74 downstream of the second separation baffle 72, and a vane section 76 downstream of the third separation baffle 74. The first separation baffle 70, second separation baffle 72, third separation baffle 74, and vane section 76 are attached to an interior of the sidewall 20 in any suitable manner, such as by welding, fasteners, interference fit, etc. The first separation baffle 70, second separation baffle 72, third separation baffle 74, and vane section 76 have bottom surfaces 80, 82, 84, and 86 respectively that are flat or substantially flat and spaced from a bottom of the sidewall 20 to allow liquid, such as water, to flow below the baffles 70, 72, and 74 and vane section 76 and to prevent sediment buildup. The bottom surfaces 80, 82, 84, and 86 are spaced distances D1, D2, D3, and D4 respectively from the bottom of the sidewall 20. The distances D1, D2, and D3 are the same or substantially the same as one another, and the distance D4 is greater than the distances D1, D2, and D3 to serve as a liquid seal.

Referring additionally to FIGS. 14-19, the first separation baffle 70, second separation baffle 72, third separation baffle 74, and vane section 76 each have side surfaces 90, 92, 94, and 96 respectively that match the geometry of the vessel 12 to prevent fluid from bypassing the baffles 70, 72, and 74 and the vane section 76 at sides of the vessel 12. The first separation baffle 70 and the vane section 76 each also have top surfaces 100 and 102 respectively that match the geometry of the vessel 12. As shown, the first separation baffle 70 and the vane section 76 each have a semicircular shape matching the geometry of the vessel 12 at the sides and top of the vessel. The second separation baffle 72 and the third separation baffle 74 each also have top surfaces 104 and 106 respectively that are flat or substantially flat and spaced from the top of the vessel 12. It will be appreciated however, that other suitable geometries may be used the first separation baffle 70, second separation baffle 72, third separation baffle 74, vane section 76, and the vessel 12.

Figure 14:
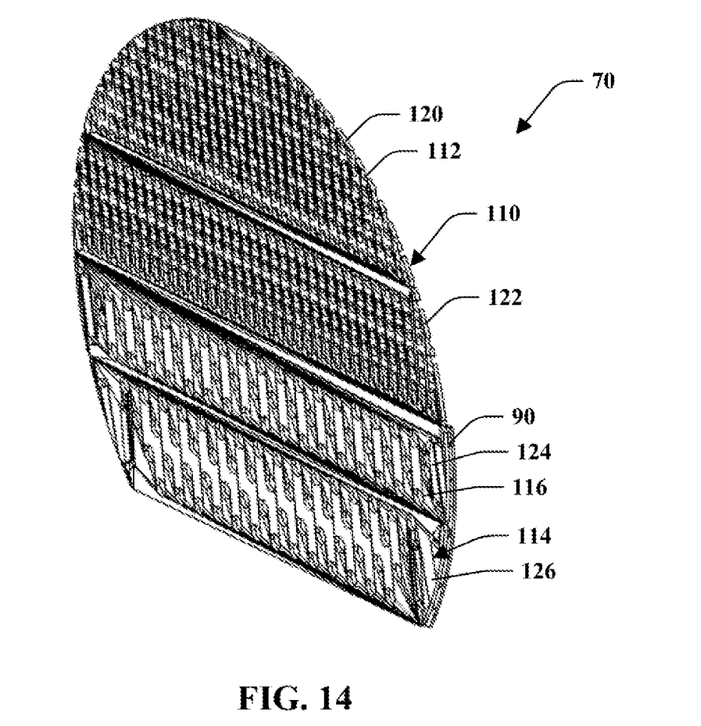
FIG. 14 is a perspective view of a first separation baffle.
Figure 15:
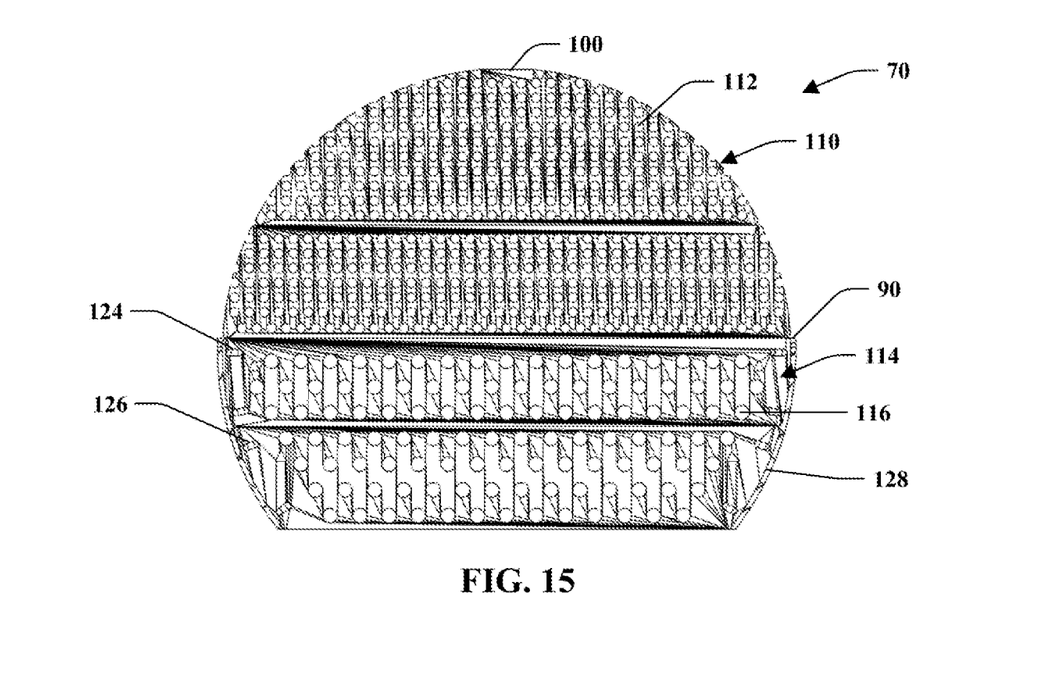
FIG. 15 is a front view of the first separation baffle.

Turning now to FIGS. 14 and 15, the first separation baffle 70 is illustrated. The first separation baffle 70 includes a gas separation section 110 including a plurality of gas openings 112 extending through the baffle 70, and a liquid separation section 114 below the gas separation section 110 including a plurality of liquid openings 116 extending through the first separation baffle 70. The gas separation section 110 may be formed of one or more flat or substantially flat plates, such as two plates 120 and 122 as shown. Similarly, the liquid separation section 114 may be formed by one or more flat or substantially flat plates, such as two plates 124 and 126 that may be attached by connector plates 128 at opposite ends thereof by suitable fasteners. As shown, the plurality of gas openings 112 each have smaller diameters than the plurality of liquid openings 114. The gas separation section 110 serves to separate liquid from the gas flowing through the first separation baffle 70, and the liquid separation section 114 serves as a calming baffle to slow the flow of water and oil to assist in separation. The first separation baffle 70 may be spaced downstream from the inlet diverter 54 a distance, for example, one tenth to one vessel diameter downstream of the inlet diverter 54.

Figure 16:
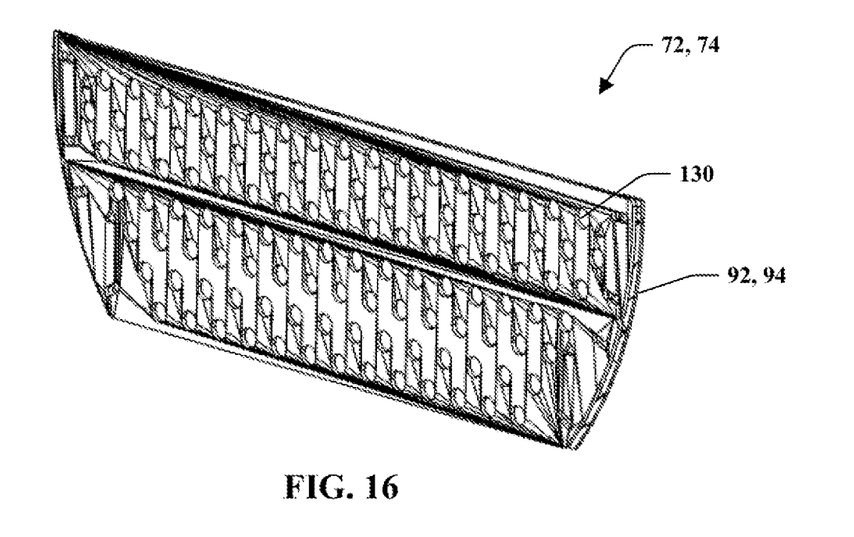
FIG. 16 is a perspective view of another separation baffle.
Figure 17:
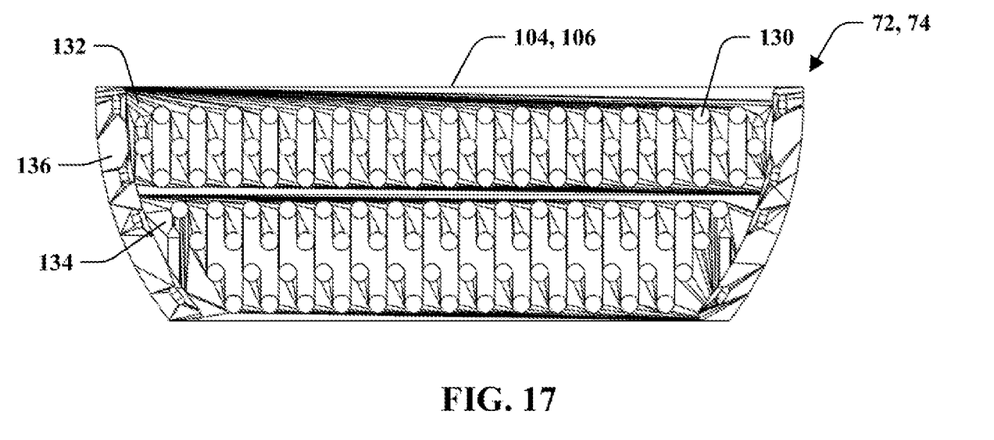
FIG. 17 is a front view of the separation baffle.

Turning now to FIGS. 16 and 17, the second and third separation baffles 72 and 74, which are the same, are illustrated. As noted above, the second and third separation baffles 72 and 74 do not extend to the top or to the bottom of the vessel 12 forming a gas gap between the top surfaces 104 and 106 and the top of the vessel 12 allowing separated gas to flow over the top surfaces 104 and 106 and a water gap between the bottom surfaces 82 and 84 and the bottom of the vessel 12 allowing separated water to flow undisturbed under the bottom surfaces 82 and 84. The top surfaces 104 and 106 of the second and third separation baffles 72 and 74 are vertically aligned with the top of the liquid separation section 114 of the first separation baffle 70. The second and third separation baffles 72 and 74 each include a plurality of liquid openings 130 extending through the baffles 72 and 74. The second and third separation baffles 72 and 74 may be formed by one or more flat or substantially flat plates, such as two plates 132 and 134 that may be attached by connector plates 136 at opposite ends thereof by suitable fasteners. The second and third separation baffles serve as calming baffles to slow the flow of water and oil to assist in separation.

Figure 18:
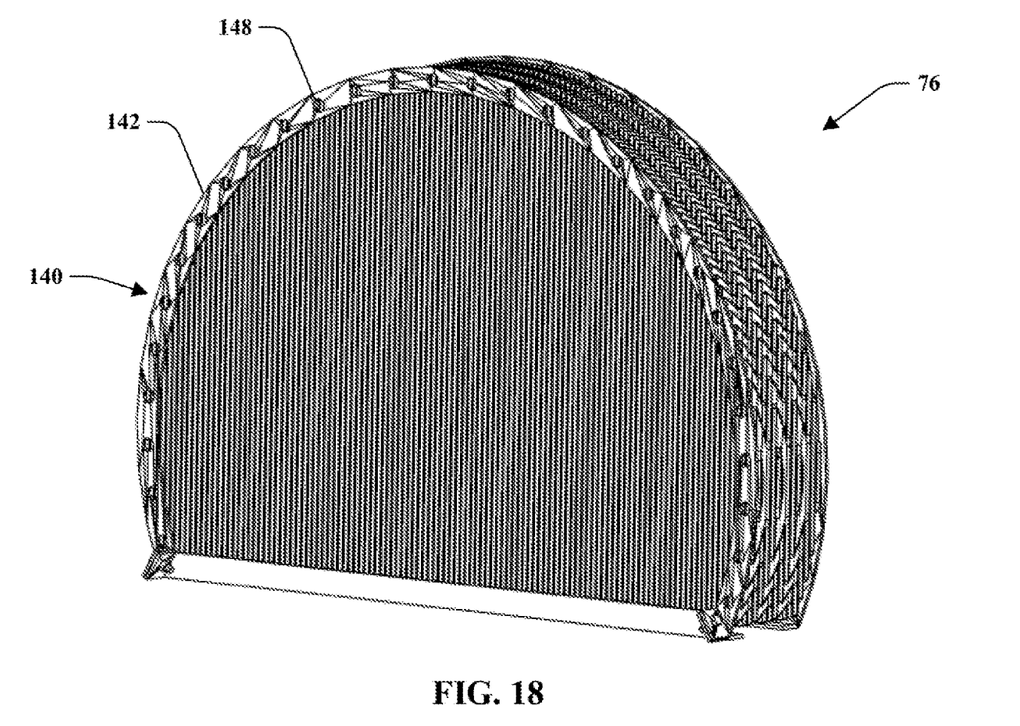
FIG. 18 is a perspective view of a vane section.
Figure 19:
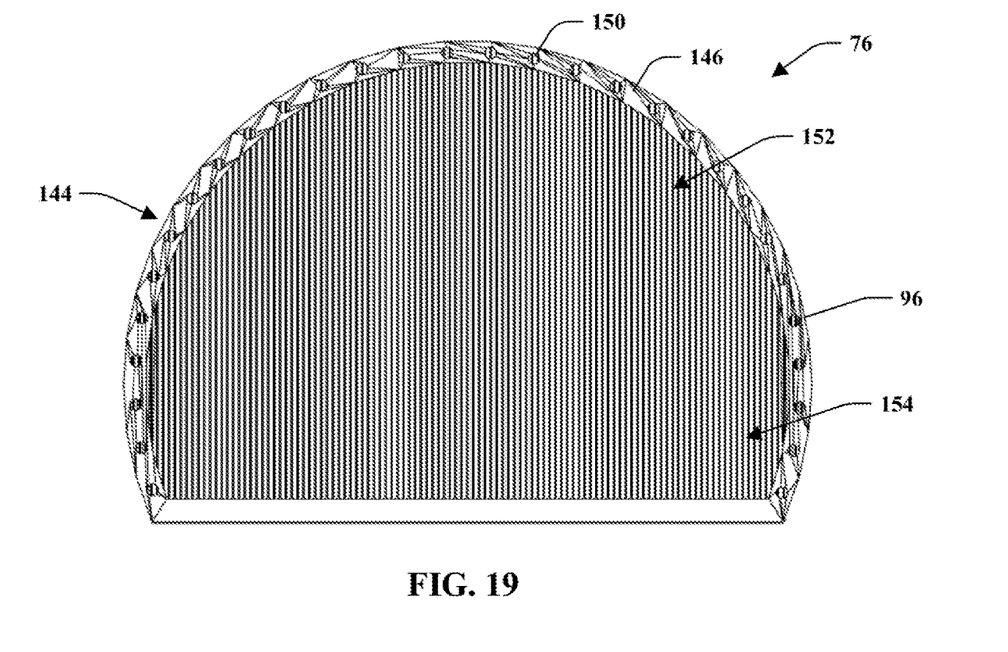
FIG. 19 is a rear view of the vane section.

Turning now to FIGS. 18 and 19, the vane section 76 includes an upstream face 140 having a frame 142 extending around a periphery thereof and a downstream face 144 having a frame 146 extending around a periphery thereof. Each frame 142 and 146 includes a plurality of openings 148, 150 respectively that extend therethrough to allow gas and fluid to flow through the upstream and downstream faces 140 and 144 at the frames 142 and 146 to increase the available area for fluid to flow. The vane section 76 also includes a gas separation section 152 and a liquid separation section 154 below the gas separation section 152, where the bottom of the gas separation section 152 is aligned with a top of a plate 166. The gas separation section 152 serves as a demister for separating liquid from the gas flowing through the vane section 76 such that the liquid drops into the liquid separation section 154, and the liquid separation section 154 serves as a coalescing device for separating water from the oil flowing through the vane section 76, and extends partially into a liquid section of the vessel 12 to form a seal to force the gas to flow through the vane section 76. The liquid separation section 154 can be separated into an oil section, a mixture section, and a water section, and those sections could be adjusted, for example based on a reading from a displacer in the vessel. The vane section 76 is provided with a plurality of thin plate-like structures or lamellae that are fitted parallel, in modular form, and very close to one another, with open spaces between adjacent lamellae. The vane section 76 may be spaced downstream from first separation baffle 70 a distance, for example, one quarter to three vessel diameter downstream of the first separation baffle 70.

Referring again to FIGS. 9-11, the collection section 52 is in communication with an outlet area of the separation section 50 to receive the separated water, oil, and gas from the separation section 50. The collection section 52 includes a water collection section 160 adjacent the outlet area, an oil collection section 162 adjacent the water collection section 160 at the second end of the vessel 12, and a gas outlet 164 at a top of the vessel 12.

The water collection section 160 has an end formed by a weir plate 166, and the sides are formed by the sidewall 20 of the vessel 12. Provided at the bottom of the vessel 12 is a conduit 168 serving as a water outlet and a water vortex breaker 170 adjacent the water outlet around which water flows. A sight glass and/or suitable control valve and level controller can be used to determine the water level in the water collection section 160. If the water is at or above a predetermined height, the valve will be opened allowing a portion or all of the water to exit the water collection section 160 via the conduit 168.

The weir plate 166 is secured to the inner surface of the vessel 12. The weir plate 166 has a substantially circular geometry matching the geometry of the vessel 12 such that the sides and bottom of the weir plate 166 abut the sides and bottom of the vessel 12 to prevent fluid from flowing around the weir plate 166. A top of the weir plate is flat or substantially flat providing an area for the oil to flow from the water collection area 160 to the oil collection area 162. The top of the weir plate is aligned with a bottom of the gas separation section 152 of the vane 76.

The oil collection section 162 has one end formed by the weir plate 166 and one end formed by the end cap 24, and the sides are formed by the sidewall 20 of the vessel 12. Provided at the bottom of the vessel 12 is a conduit 180 serving as an oil outlet and an oil vortex breaker 182 adjacent the oil outlet around which oil flows. A sight glass, for example at one of the ports 34, and/or suitable control valve and level controller can be used to determine the oil level in the oil collection section 162. If the oil is at or above a predetermined height, the valve will be opened allowing a portion or all of the oil to exit the oil collection section 162 via the conduit 180. Prior to entering the oil collection section 162, the oil sits atop the water in the water collection section 160. When the level in the water collection section reaches the top of the weir plate 166, the oil spills over into the oil collection section 162.

The gas outlet 164 is provided at the top of the vessel 12 above the oil collection section 162. The gas that exits the gas separation section 152 of the vane 76 exits the outlet area of the separation section and flows to the gas outlet 164, where the gas flows through a gas vortex breaker 184. Additionally or alternatively, it will be appreciated that a diverter plate or vane demister may be installed at the gas outlet, and a gas dome may also be used to reduce velocity.

Disposed at the bottom of the collection section 50, for example below the baffle 70, is a trap 190, such as a sand trap. The sand trap is provided to remove sediment or particulate matter that settles to the bottom of the vessel 12. As shown, the sand trap has an inverted v-shaped cover 192 that extends longitudinally on the bottom of the vessel 12. The cover 192 is provided with a plurality of cutouts, such as triangular or inverted v-shaped cutouts 194 provided on either side of the cover 192 so that the cutouts 194 are adjacent the bottom of the vessel 12. One or more of the conduits 40 communicates with an underside of the trap to serve as a sediment blow down drain to blow down sediment that accumulates in and around the trap 70.

Turning now to the operation of the assembly 10, the inlet 30 is connected to a conduit to receive the process fluid, such as a three-phase fluid, such as water/oil/gas. The fluid enters the separation section 50 via the inlet diverter 54, which directs the process fluid back towards the end cap 22 to reduce the flow rate of the fluid and to increase the liquid droplet residence time. The fluid then flows toward the first separation baffle 70, where the gas/liquid flows through the gas separation section 110, the water/oil flows through the liquid separation section 114, and water flows under the first separation baffle 70. The gas separation section 110 of the first separation baffle 70 separates at least some of the liquid from the gas flowing therethrough and the liquid separation section 114 calms and assists in separating at least some of the water from the oil flowing therethrough.

The fluids then flow toward the second separation baffle 72, where the gas flows over the top surface 104, the water/oil flows through the second separation baffle 72, and the water flows under the second separation baffle 72. Similarly, the fluids then flow toward the third separation baffle 74, where the gas flows over the top surface 106, the water/oil flows through the third separation baffle 746, and the water flows under the third separation baffle 74. The second and third separation baffles 72 and 74 calm and assist in separating at least some of the water from the oil flowing therethrough.

The fluid then flows to the vane section 76, where the gas flows through the gas separation section 152 and the oil, water oil, and water flows through the liquid separation section 154. The gas separation section 152 services as a demister for removing liquid from the gas flowing through the vane section 76 and the liquid separation section 154 serves as a coalescing device for removing water from the oil flowing through the vane section 76.

The separated fluid then exits the separation section and the water and oil enter the water collection area 160, where the oil sits on the water and spills over into the oil collection area 162 if the level of oil rises above the top of the weir plate 166, and the gas flows to the gas outlet 164. The water and oil can be dumped from the system if the levels of the water and oil are above a predetermined height.

The aforementioned systems, components, (e.g., separation vessel, baffles, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

While the embodiments discussed herein have been related to the systems and methods discussed above, these embodiments are intended to be exemplary and are not intended to limit the applicability of these embodiments to only those discussions set forth herein.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The best mode for carrying out the invention has been described for purposes of illustrating the best mode known to the applicant at the time and enable one of ordinary skill in the art to practice the invention, including making and using devices or systems and performing incorporated methods. The examples are illustrative only and not meant to limit the invention, as measured by the scope and merit of the claims. The invention has been described with reference to preferred and alternate embodiments. Modifications and alterations will occur to others upon the reading and understanding of the specification. It is intended to include all such modifications and alterations insofar as they come within the scope of the appended claims or the equivalents thereof. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. An assembly comprising:
   a vessel having first and second ends and an interior defining a separation section and a collection section;
   an inlet diverter disposed in the interior at the first end and configured to receive a three phase fluid flowing in a first direction from the first end toward the second end and direct the fluid in a second direction opposite the first direction towards the first end;
   at least one flow baffle disposed in the interior downstream of the inlet diverter, the at least one flow baffle having a gas separation section including a plurality of gas openings extending through the baffle, a liquid separation section below the gas separation section including a plurality of liquid openings extending through the baffle, and a bottom surface spaced from a bottom interior surface of the vessel to define a fluid flow path between the bottom surface and the bottom interior surface; and
   at least one vane section disposed in the interior downstream of the at least one flow baffle for serving as a demister for gas flowing therethrough and as a coalescing device for liquid flowing therethrough, the at least one vane section having a bottom surface spaced from the bottom interior surface of the vessel to define a fluid flow path between the bottom surface and the bottom interior surface
   wherein the bottom surface of the at least one flow baffle is spaced a first distance from the bottom interior surface, and the bottom surface of the at least one vane section is spaced a second distance from the bottom interior surface greater than the first distance.

2. The assembly according to claim 1, wherein the at least one flow baffle and the at least one vane section each have respective top and side surfaces abutting a top interior surface of the vessel and sides of the vessel respectively.

3. The assembly according to claim 1 further including at least one liquid flow baffle disposed in the interior downstream of the at least one flow baffle, the at least one liquid flow baffle having a top surface spaced from a top interior surface of the vessel to define a fluid flow path between the top surface and the top interior surface, and a bottom surface spaced from the bottom interior surface of the vessel to define a fluid flow path between the bottom surface and the bottom interior surface.

4. The assembly according to claim 3, wherein the bottom surface of the at least one flow baffle and the at least one liquid flow baffle are spaced a first distance from the bottom interior surface, and the bottom surface of the at least one vane section is spaced a second distance from the bottom interior surface greater than the first distance.

5. The assembly according to claim 3, wherein the at least one liquid flow baffle includes first and second liquid flow baffles disposed in the interior downstream of the at least one flow baffle and upstream of the at least one vane section.

6. The assembly according to claim 1, further including a weir disposed in the interior downstream of the at least one vane section, wherein the weir defines with the second end of the vessel a chamber for liquid that flows over a top of the weir.

7. The assembly according to claim 1, wherein the inlet diverter includes a top plate, a bottom plate, and a vane assembly therebetween, the vane assembly having a plurality of vanes positioned beside each other.

8. The assembly according to claim 7, where the plurality of vanes are positioned in a nested arrangement.

9. The assembly according to claim 7, wherein the inlet diverter includes first and second vane groups each including a plurality of the plurality of vanes, and where the first vane group is a mirror image of the second vane group.

10. The assembly according to claim 7, wherein the inlet diverter further includes vane guides projecting upward from the top plate and downward from the bottom plate that illustrate respective flow paths defined by the plurality of vanes.

11. The assembly according to claim 7, wherein the bottom plate of the inlet diverter includes a plurality of apertures that extend along and curve with respective flow paths defined by the plurality of vanes for entrained particulates to fall through during operation.

12. An assembly comprising:
    a vessel having first and second ends and an interior defining a separation section and a collection section;
    an inlet diverter disposed in the interior at the first end and configured to receive a three phase fluid flowing in a first direction from the first end toward the second end and direct the fluid in a second direction opposite the first direction towards the first end into the collection section;
    at least one flow baffle disposed in the interior downstream of the inlet diverter, the at least one flow baffle having a bottom surface spaced a first distance from a bottom interior surface of the vessel to define a fluid flow path between the bottom surface and the bottom interior surface;
    at least one liquid flow baffle disposed in the interior downstream of the at least one flow baffle, the at least one liquid flow baffle having a top surface spaced from a top interior surface of the vessel to define a fluid flow path between the top surface and the top interior surface, and a bottom surface spaced from the bottom interior surface of the vessel to define a fluid flow path between the bottom surface and the bottom interior surface; and
    at least one vane section disposed in the interior downstream of the at least one flow baffle, the at least one vane section having a bottom surface spaced a second distance greater than the first distance from the bottom interior surface of the vessel to define a fluid flow path between the bottom surface and the bottom interior surface and to serve as a fluid seal.

13. The assembly according to claim 12, where the at least one flow baffle includes a gas separation section including a plurality of gas openings extending through the baffle and a liquid separation section below the gas separation section including a plurality of liquid openings extending through the baffle, and wherein the at least one flow baffle and the at least one vane section each have respective top and side surfaces abutting a top interior surface of the vessel and sides of the vessel respectively.

14. The assembly according to claim 12, wherein the bottom surface of the at least one liquid flow baffle is spaced the first distance from the bottom interior surface.

15. The assembly according to claim 12, wherein the inlet diverter includes a top plate, a bottom plate, and a vane assembly therebetween, the vane assembly having a plurality of vanes positioned beside each other.

16. The assembly according to claim 15, wherein the bottom plate of the inlet diverter includes a plurality of apertures that extend along and curve with respective flow paths defined by the plurality of vanes for entrained particulates to fall through during operation.

17. An assembly comprising:
a vessel having first and second ends;
an inlet diverter disposed in the interior at the first end;
at least one first baffle disposed in the interior downstream of the inlet diverter, the at least one first baffle having a top surface abutting a top interior surface of the vessel and a bottom surface spaced from a bottom interior surface of the vessel;
at least one second baffle disposed in the interior downstream of the at least one first baffle, the at least one second baffle having a top surface spaced from the top interior surface of the vessel and a bottom surface spaced from the bottom interior surface of the vessel; and
at least one vane section disposed in the interior downstream of the at least one first baffle, the at least one vane section having a top surface abutting the top interior surface of the vessel and a bottom surface spaced from the bottom interior surface of the vessel.

18. The assembly according to claim 17, wherein the bottom surface of the at least one first baffle and the bottom surface of the at least one second baffle are spaced a first distance from the bottom interior surface, and the bottom surface of the at least one vane section is spaced a second distance from the bottom interior surface greater than the first distance.

* * * * *